(12) United States Patent
Son et al.

(10) Patent No.: US 10,967,817 B2
(45) Date of Patent: Apr. 6, 2021

(54) VEHICLE AND METHOD OF PROVIDING FUEL CONSUMPTION INFORMATION THEREOF

(71) Applicants: Hyundai Motor Company, Seoul (KR); Kia Motors Corporation, Seoul (KR)

(72) Inventors: Hui Un Son, Suwon-si (KR); Jea Mun Lee, Seoul (KR); Sung Bae Jeon, Ansan-si (KR); Joon Young Park, Seoul (KR); Jin Kyeom Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 25 days.

(21) Appl. No.: 16/687,524

(22) Filed: Nov. 18, 2019

(65) Prior Publication Data

US 2020/0340420 A1    Oct. 29, 2020

(30) Foreign Application Priority Data

Apr. 25, 2019    (KR) .................. 10-2019-0048256

(51) Int. Cl.
*B60R 16/023* (2006.01)
*F02D 41/30* (2006.01)
(Continued)

(52) U.S. Cl.
CPC ......... *B60R 16/0236* (2013.01); *B60W 10/18* (2013.01); *B60W 20/13* (2016.01);
(Continued)

(58) Field of Classification Search
CPC ......... F02D 2200/0625; F02D 2200/50; F02D 2200/501; F02D 2200/602;
(Continued)

(56) References Cited

U.S. PATENT DOCUMENTS

| 5,578,748 A * | 11/1996 | Brehob | G01F 9/023 |
| | | | 701/123 |
| 8,903,637 B2 * | 12/2014 | Lee | G07C 5/085 |
| | | | 701/123 |

(Continued)

FOREIGN PATENT DOCUMENTS

| KR | 10-1062720 B1 | 9/2011 |
| KR | 10-1114381 B1 | 2/2012 |
| KR | 10-1724733 B1 | 4/2017 |

*Primary Examiner* — Erick R Solis
*Assistant Examiner* — Robert A Werner
(74) *Attorney, Agent, or Firm* — Morgan, Lewis & Bockius LLP

(57) ABSTRACT

Disclosed are a vehicle and a method of providing fuel consumption information thereof in which the influence of driver's pedal operation on actual fuel consumption, including a latent distance to empty (DTE), due to variation in kinetic energy of the vehicle may be displayed. The method includes detecting whether or not one of an accelerator pedal and a brake pedal is operated, determining guidance fuel consumption based on a change in an available coasting distance according to a change in a vehicle speed due to operation of the one of the accelerator pedal and the brake pedal, which is detected, and outputting the determined guidance fuel consumption.

17 Claims, 17 Drawing Sheets

(51) Int. Cl.
*B60W 30/18* (2012.01)
*B60W 40/09* (2012.01)
*B60W 10/18* (2012.01)
*B60W 20/13* (2016.01)
*G01F 9/02* (2006.01)

(52) U.S. Cl.
CPC ...... *B60W 30/18072* (2013.01); *B60W 40/09* (2013.01); *F02D 41/3005* (2013.01); *G01F 9/02* (2013.01); *F02D 2200/0625* (2013.01)

(58) Field of Classification Search
CPC ........ F02D 2200/702; B60W 30/18072; G01F 9/00; G01F 9/02; B60R 16/0236
USPC ............................ 701/123; 73/114.52–114.54
See application file for complete search history.

(56) References Cited

U.S. PATENT DOCUMENTS

| | | | | |
|---|---|---|---|---|
| 2007/0256481 | A1* | 11/2007 | Nishiyama | G01F 9/02 73/114.52 |
| 2014/0088858 | A1* | 3/2014 | Stefan | B60W 30/18072 701/123 |
| 2014/0180564 | A1* | 6/2014 | Ichinokawa | B60W 50/14 701/123 |
| 2019/0337516 | A1* | 11/2019 | Kumazawa | B60W 10/30 |

* cited by examiner $$\frac{\Delta s_{\Delta v, coasting}}{0}$$

Max $$\frac{-\Delta s_{uphill, loss}}{\Delta m}$$

-5km/l

VEHICLE AND METHOD OF PROVIDING FUEL CONSUMPTION INFORMATION THEREOF

The present application claims priority to Korean Patent Application No. 10-2019-0048256, filed on Apr. 25, 2019, the entire contents of which is incorporated herein for all purposes by this reference.

BACKGROUND OF THE INVENTION

Field of the Invention

The present invention relates to a vehicle and a method of providing fuel consumption information thereof in which the influence of driver's pedal operation on actual fuel consumption, including a latent distance to empty (DTE), due to variation in kinetic energy of the vehicle may be displayed.

Description of Related Art

Many drivers strive to achieve high fuel consumption while monitoring their own driving through fuel consumption information displayed through a cluster. Here, instant fuel consumption means fuel consumption acquired by dividing a driving distance during a designated time section by a fuel consumption amount, and average fuel consumption means fuel consumption acquired by dividing a cumulative driving distance from an initialization time to the current time by a cumulative fuel consumption amount.

However, in the provision of instant fuel consumption in a general vehicle, if an accelerator pedal is not operated, for example, when coasting is performed or when a brake pedal is operated, instant fuel consumption is displayed as infinity ($\infty$) or the maximum value, and thus, a sense of difference with driving while actually consuming fuel may occur. Particularly, in an eco-friendly vehicle, such as a hybrid electric vehicle, instant fuel consumption is displayed as infinity ($\infty$) in an electric vehicle (EV) mode in which the vehicle is driven using only a driving motor, a driver may forcibly intend to enter the EV mode to raise actual fuel consumption to the instant fuel consumption displayed on a cluster. However, since a source of electric power used in the EV mode is driving power of an engine, if the driver excessively intends to drive the vehicle in the EV mode, the engine is needlessly started to charge a battery and thus actual fuel consumption is rather lowered.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a vehicle and a method of providing fuel consumption information thereof that substantially obviate one or more problems due to limitations and disadvantages of the related art.

Various aspects of the present invention are directed to providing a vehicle and a method of providing fuel consumption information thereof in which the fuel consumption information actually varied due to driver's operation or a driving environment may be effectively output.

Various aspects of the present invention are directed to providing a vehicle and a method of providing fuel consumption information thereof in which the fuel consumption information based on a latent distance to empty (DTE) due to variation in kinetic energy caused by driver's pedal operation and a change in a slope may be output.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

To achieve these objects and other advantages and in accordance with the present invention, as embodied and broadly described herein, a method of providing fuel consumption information related to a vehicle includes detecting whether or not one of an accelerator pedal and a brake pedal is operated, determining guidance fuel consumption based on a change in an available coasting distance according to a change in a vehicle speed due to operation of the one of the accelerator pedal and the brake pedal, which is detected, and outputting the determined guidance fuel consumption.

In another aspect of the present invention, a vehicle of providing fuel consumption information includes a guidance fuel consumption controller configured to detect whether or not one of an accelerator pedal and a brake pedal is operated and to determine guidance fuel consumption based on a change in an available coasting distance according to a change in a vehicle speed due to operation of the one of the accelerator pedal and the brake pedal, which is detected, and an output unit configured to output the determined guidance fuel consumption.

It is to be understood that both the foregoing general description and the following detailed description of the present invention are exemplary and explanatory and are intended to provide further explanation of the present invention as claimed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
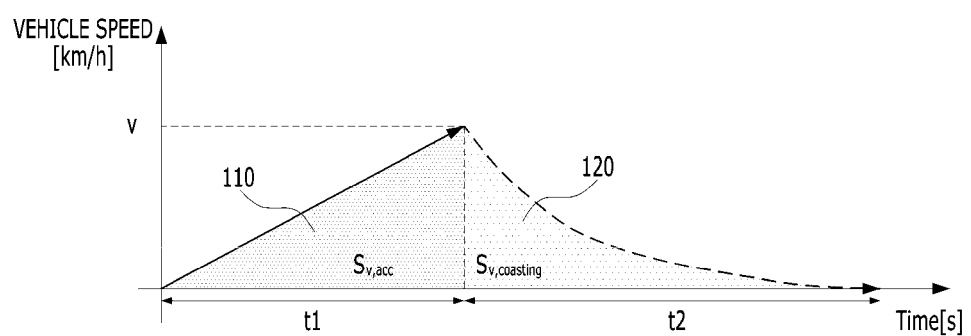
FIG. 1A and FIG. 1B are graphs illustrating the concept of guidance fuel consumption in connection with operation of an accelerator pedal in accordance with an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description of the embodiments, the terms "including", etc. will be interpreted as indicating the presence of one or more other characteristics, numbers, steps, operations, elements or parts stated in the specification or combinations thereof, and do not exclude the presence of additional characteristics, numbers, steps, operations, elements, parts or combinations thereof, or the possibility of adding the same, unless stated otherwise.

Various aspects of the present invention are directed to providing a method of intuitively providing the influence of current pedal operating amounts by a driver and a driving situation on actual fuel consumption, by displaying fuel consumption in which a change in a latent distance to empty (DTE) according to variation in kinetic energy due to accelerating, braking, coasting, uphill driving, or downhill driving of a vehicle is reflected.

In the following description of the embodiments, instant fuel consumption according to a change in the latent distance to empty (DTE) provided in the exemplary embodiment of the present invention will be referred to as "guidance fuel consumption", to be distinguished from general instant fuel consumption. Furthermore, for convenience of description, it will be assumed that the vehicle enters a fuel-cut state during coasting and thus the fuel amount consumed is 0.

First, referring to FIG. 1A and FIG. 1B, the concept of guidance fuel consumption will be described.

Figure 1B:
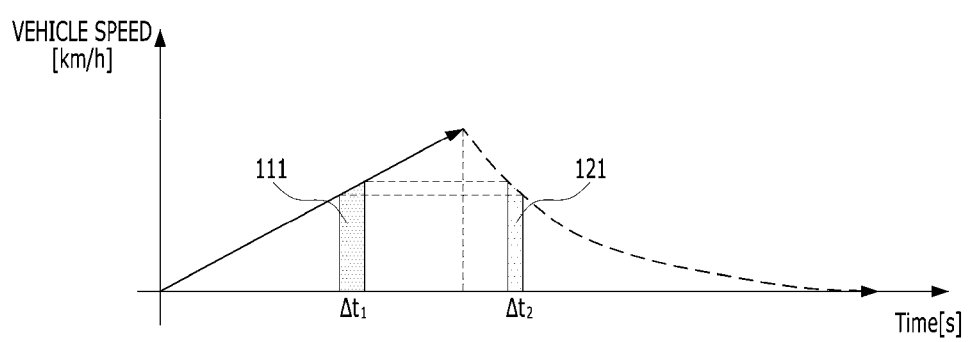

FIG. 1A and FIG. 1B are graphs illustrating the concept of guidance fuel consumption in connection with operation of an accelerator pedal in accordance with an exemplary embodiment of the present invention.

In the graphs shown in FIG. 1A and FIG. 1B, the horizontal axis indicates time, the vertical axis indicates vehicle speed, and it is assumed that a driver operates the accelerator pedal to accelerate a vehicle for a time t1 and then takes his or her foot off the accelerator pedal to perform coasting of the vehicle for a time t2. Furthermore, the area of each graph represents a moving distance.

First, referring to FIG. 1A, a mass of fuel consumed to accelerate the vehicle for the time t1 is m, and a moving distance corresponds to $s_v,\text{acc}$ 110. Furthermore, the vehicle coasts for the time t2, and thus, a mass of fuel consumed is 0 and a moving distance corresponds to $s_v,\text{coasting}$ 120. Therefore, by a general determination method, average fuel consumption for the time t1 may be $$\frac{s_v, acc}{m},$$

and average fuel consumption for the time t2 may be displayed as infinite because the mass of fuel consumed, i.e., the denominator, m is 0.

However, in accordance with the exemplary embodiment of the present invention, not only the moving distance at the moment when the fuel is consumed but also an available coasting distance due to variation in kinetic energy is considered. For example, in FIG. 1B, energy consumed for Δt1 is used in acceleration of the vehicle by the moving distance 111 for the corresponding time section, and contributes to an increase in a coasting section 120 (in FIG. 1A) by a coasting distance 121 corresponding to a speed increase through acceleration. Therefore, the effect of actual operation of the accelerator pedal on fuel consumption, i.e., the guidance fuel consumption in accordance with various aspects of the present invention, is determined in consideration of the changed coasting distance. This will be described with reference to FIG. 2A and FIG. 2B.

Figure 2A:
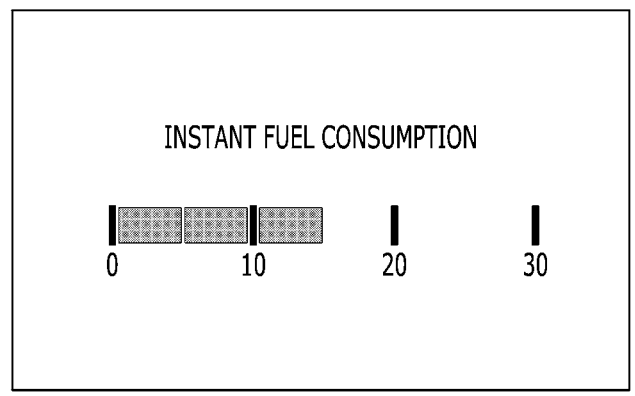
FIG. 2A and FIG. 2B are views illustrating one example of determination of guidance fuel consumption in an accelerator pedal operation situation in accordance with an exemplary embodiment of the present invention.
Figure 2B:
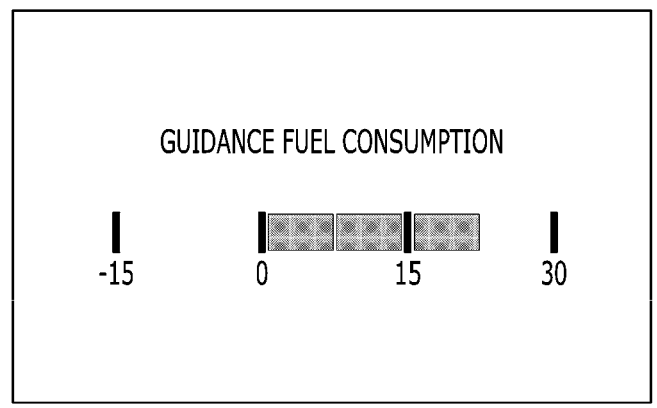

FIG. 2A and FIG. 2B are views illustrating one example of determination of guidance fuel consumption in an accelerator pedal operation situation in accordance with an exemplary embodiment of the present invention;

FIG. 2A and FIG. 2B are views respectively illustrating fuel consumption formulas, fuel consumption graphs displayed on the cluster, and determined fuel consumption values in the downward direction from the top, and it is assumed that Δt1 in FIG. 1B is a fuel consumption determination section. Furthermore, it is assumed that an amount of the fuel consumed in the section Δt1 is Δm.

First, referring to FIG. 2A, general instant fuel consumption is acquired by dividing a moving distance $\Delta s_{\Delta v,acc}$ in the fuel consumption determination section by the fuel amount consumed Δm, and may thus be determined as $$\frac{\Delta s_{\Delta v,acc}}{\Delta m}.$$

In contrast, as exemplarily shown in FIG. 2B, the guidance fuel consumption is acquired in consideration of an increase in the coasting distance $\Delta s_{\Delta v,coasting}$ (corresponding to 121 of FIG. 1B) due to an increase in the vehicle speed by acceleration, and may thus be determined as $$\frac{\Delta s_{\Delta v,acc} + \Delta s_{\Delta v,coasting}}{\Delta m}.$$

Therefore, the guidance fuel consumption during operation of the accelerator pedal has a greater value than the general instant fuel consumption. Accordingly, the driver may recognize fuel consumption effects in which a latent moving distance using fuel consumed through operation of the accelerator pedal is considered, through such guidance fuel consumption.

Next, guidance fuel consumption in a coasting situation will be described with reference to FIG. 3A and FIG. 3B.

Figure 3A:
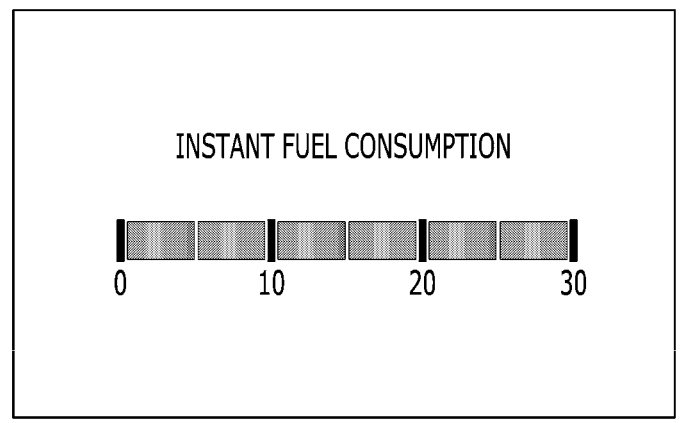
FIG. 3A and FIG. 3B are views illustrating one example of determination of guidance fuel consumption in a coasting situation in accordance with an exemplary embodiment of the present invention.
Figure 3B:
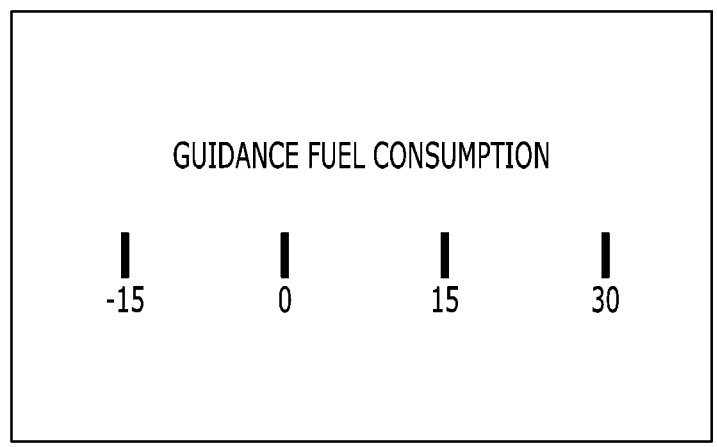

FIG. 3A and FIG. 3B are views illustrating one example of determination of guidance fuel consumption in a coasting situation in accordance with an exemplary embodiment of the present invention.

First, referring to FIG. 3A, general instant fuel consumption is determined by dividing a moving distance $\Delta s_{\Delta v,coasting}$ in the fuel consumption determination section by the fuel amount consumed, a determined value of the general instant fuel consumption in the coasting situation is infinite because the denominator $\Delta m$ is 0, and the general instant fuel consumption is displayed as Max on the cluster.

Referring to FIG. 3B, in accordance with the exemplary embodiment of the present invention, if the vehicle coasts due to non-operation of any pedal by the driver, a moving distance by coasting is already reflected during operation of the accelerator pedal. Therefore, as long as no pedal is additionally operated, kinetic energy of the vehicle is not changed, and thus guidance fuel consumption may not be displayed. Here, no variation in kinetic energy may mean no change due to operation of any pedal by the driver or no change due to a slope, and mean change excluding loss components which naturally occur during coasting (for example, air resistance, rolling resistance, frictional resistance of a driving system, etc.). These loss components may be referred to through comparative data which is provided in advance as a profile according to vehicle speed (hereinafter, referred to as a "coasting speed profile" for convenience), without being limited thereto, and it will be apparent to those skilled in the art that the loss components may be determined using values acquired through various sensors provided in vehicle.

Accordingly, a change in the coasting distance due to variation in kinetic energy becomes 0, and thus guidance fuel consumption may be output as 'no change'. Accordingly, a sense of difference occurring if instant fuel consumption is output as Max may be prevented.

Next, guidance fuel consumption in a brake pedal operation situation will be described with reference to FIG. 4A, FIG. 4B and FIG. 4C.

Figure 4A:
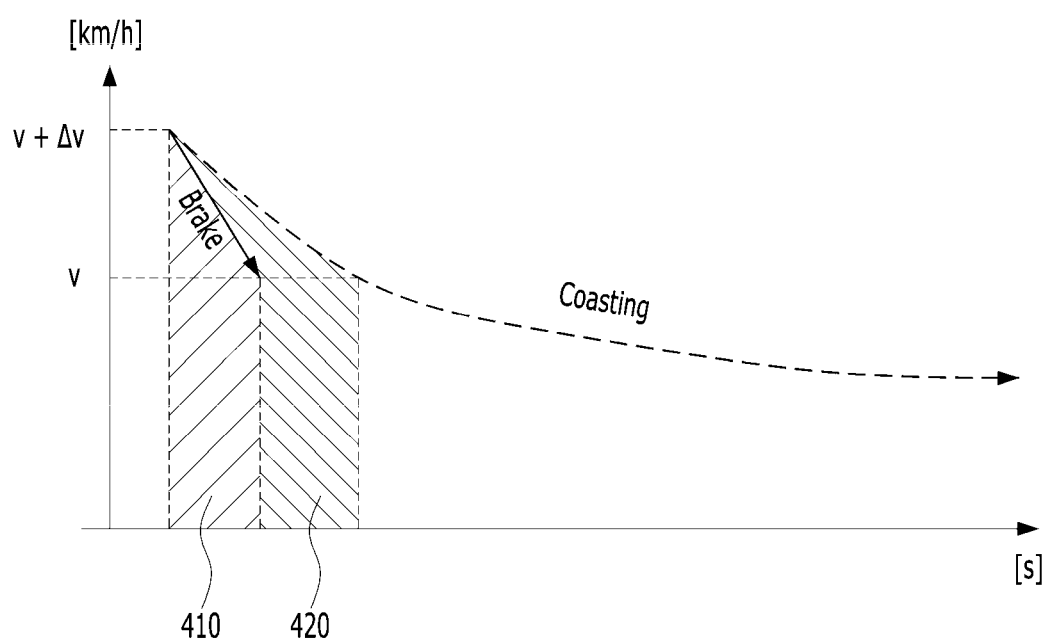
FIG. 4A, FIG. 4B and FIG. 4C are a graph and views illustrating one example of determination of guidance fuel consumption in a brake pedal operation situation in accordance with an exemplary embodiment of the present invention.
Figure 4B:
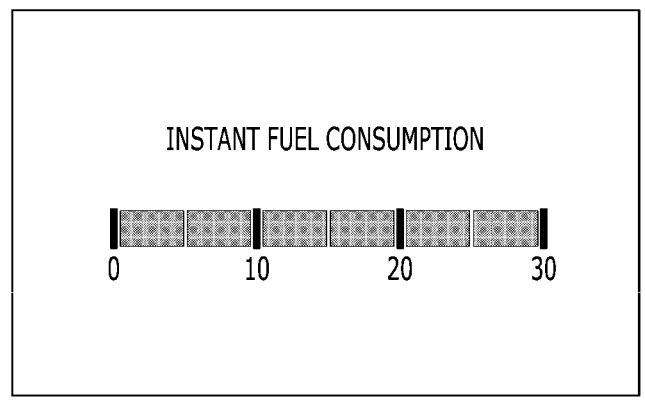
Figure 4C:
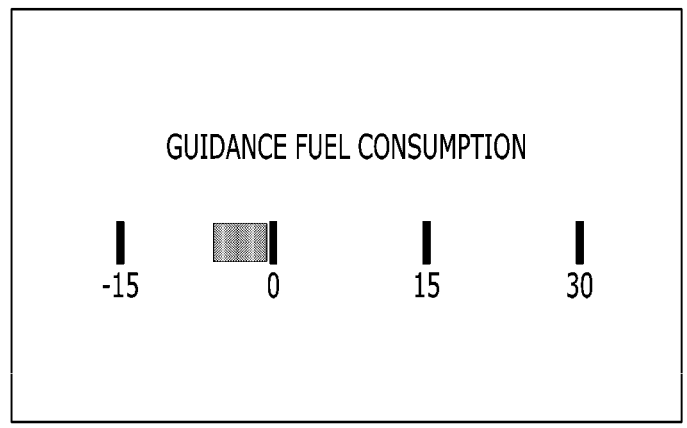

FIG. 4A, FIG. 4B and FIG. 4C are a graph and views illustrating one example of determination of guidance fuel consumption in a brake pedal operation situation in accordance with an exemplary embodiment of the present invention.

In the graph shown in FIG. 4A, the horizontal axis indicates time, and the vertical axis indicates vehicle speed.

Referring to FIG. 4A, the vehicle is decelerated by $\Delta v$ for a brake operating time, and instant fuel consumption, i.e., $$\frac{\Delta s_{brake}}{0},$$

is displayed as Max as long as a fuel consumption amount is 0 regardless of a moving distance 410 during the brake operating time, as exemplarily shown in FIG. 4B.

However, as the vehicle speed is decreased by $\Delta v$ due to operation of the brake pedal, an available coasting distance 420 is decreased in a response to the decrement of the vehicle speed. Therefore, since it is reasonable to be considered that fuel consumption during a brake pedal operation section is actually decreased, guidance fuel consumption may be determined as $$\frac{-\Delta s_{brake,loss}}{\Delta m}$$

by reflecting the decreased available coasting distance $-\Delta s_{brake,loss}$, as exemplarily shown in FIG. 4C. Here, the decreased available coasting distance is determined using Equation 1 below.

$$\Delta s_{brake,loss} = \Delta s_{\Delta v,}\text{coasting} - \Delta s \qquad \text{[Equation 1]}$$

In Equation 1, $\Delta s_{\Delta v,}$coasting means the available coasting distance which is considered in advance, and $\Delta s_{brake}$ means the moving distance during braking. Here, the fuel consumption amount $\Delta m$ may employ a fuel amount consumed when the speed is increased from v to v+$\Delta v$ during previous operation of the accelerator pedal.

The above-described determined guidance fuel consumption result value is a negative value, and thus, a sense of difference in the general method of displaying instant fuel consumption as Max even if operation of the brake pedal exerts a negative influence on fuel consumption, may be overcome.

Next, guidance fuel consumption in a road slope situation or other disturbance occurrence situations will be described with reference to FIG. 5A, FIG. 5B, and FIG. 5C and FIG. 6A, FIG. 6B, and FIG. 6C.

In a coasting situation, in which the driver does not operate the accelerator pedal or the brake pedal, if the vehicle speed is changed to a higher or lower speed than the conventional coasting speed profile due to an uphill or downhill or other disturbances, it is necessary to determine guidance fuel consumption to a vehicle speed difference, as compared to the coasting speed profile. First, referring to FIG. 5A, FIG. 5B, and FIG. 5C, an uphill coasting situation will be described.

Figure 5A:
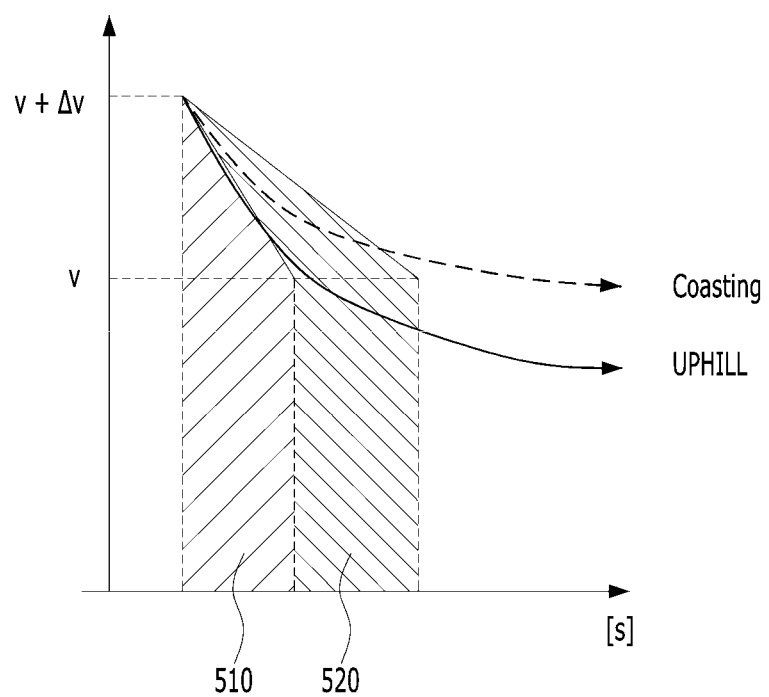
FIG. 5A, FIG. 5B, and FIG. 5C are a graph and views illustrating one example of determination of guidance fuel consumption in an uphill coasting situation in accordance with an exemplary embodiment of the present invention.
Figure 5B:
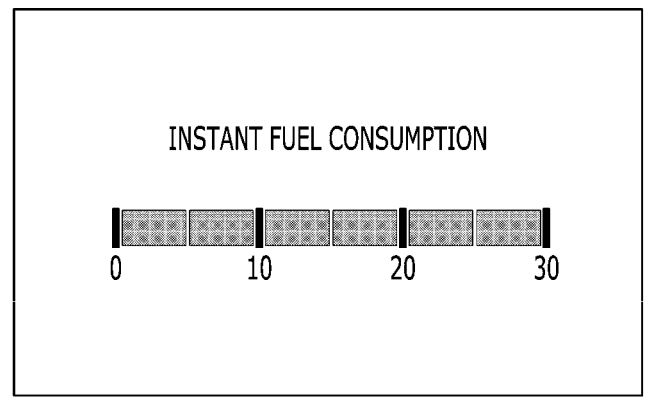
Figure 5C:
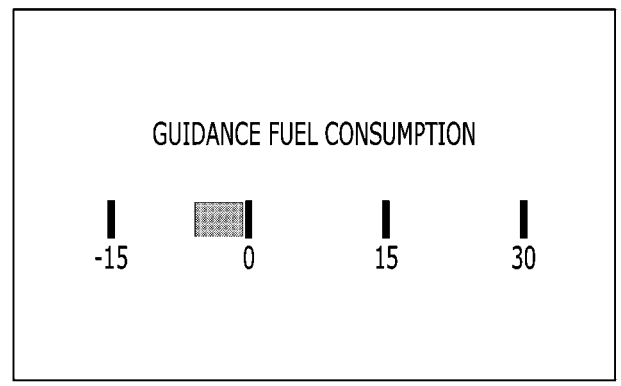

FIG. 5A, FIG. 5B, and FIG. 5C are a graph and views illustrating one example of determination of guidance fuel consumption in an uphill coasting situation in accordance with an exemplary embodiment of the present invention.

In the graph shown in FIG. 5A, the horizontal axis indicates time, and the vertical axis indicates vehicle speed. Referring to FIG. 5A, the vehicle is decelerated by $\Delta v$ during a sampling section of uphill coasting even if any pedal is not operated, and instant fuel consumption, i.e., $$\frac{\Delta s_{uphill}}{0},$$

is displayed as Max as long as a fuel consumption amount is 0 regardless of a moving distance $\Delta s_{uphill}$ 510 during the corresponding sampling section, as exemplarily shown in FIG. 5B.

However, a vehicle speed decrement $\Delta v$ due to uphill coasting is great, as compared to coasting on level ground. Therefore, an available coasting distance 520 is decreased further compared to coasting on level ground. Therefore, since it is reasonable to be considered that fuel consumption during the corresponding sampling section is actually decreased, guidance fuel consumption may be determined as $$\frac{-\Delta s_{uphill,loss}}{\Delta m}$$

by reflecting the decreased coasting distance $-\Delta s_{uphill,loss}$, as exemplarily shown in FIG. 5C. Here, the decreased coasting distance may have a value acquired by subtracting the moving distance during the sampling section from the available coasting distance increased by increasing the vehicle speed by $\Delta v$, similarly to Equation 1. Therefore, the guidance fuel consumption may be determined by dividing the decreased coasting distance by the fuel consumption amount $\Delta m$, which is used when the vehicle speed is increased from v to v+$\Delta v$ during previous operation of the accelerator pedal.

Figure 6A:
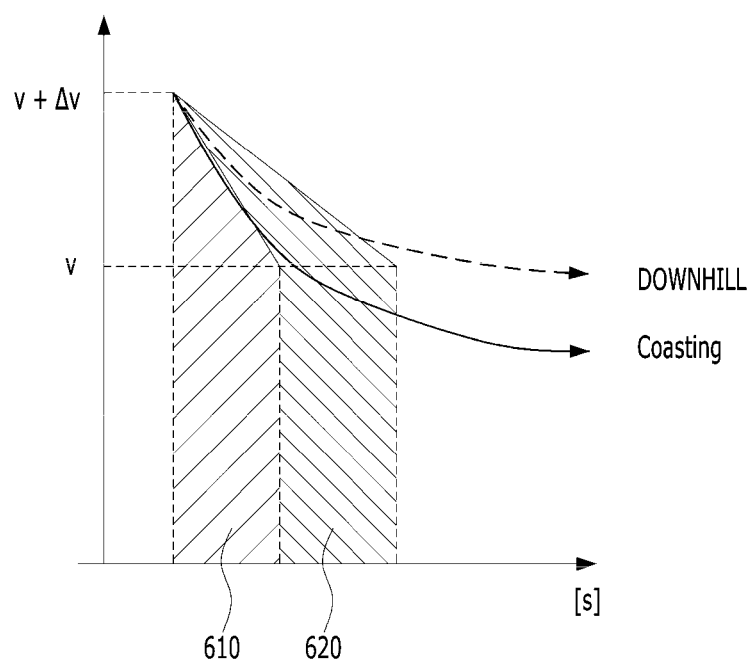
FIG. 6A, FIG. 6B, and FIG. 6C are a graph and views illustrating one example of determination of guidance fuel consumption in a downhill coasting situation in accordance with an exemplary embodiment of the present invention.
Figure 6B:
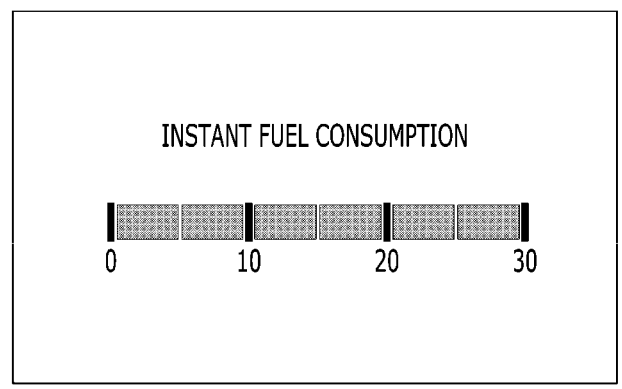
Figure 6C:
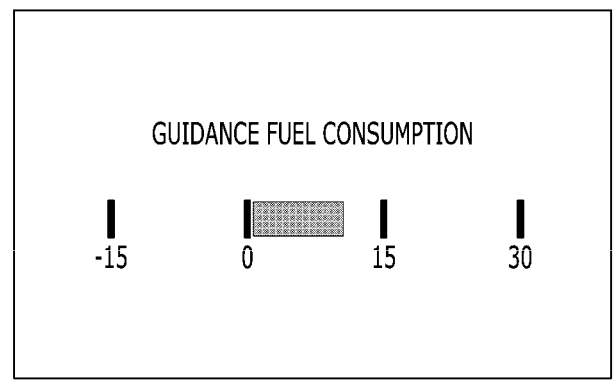

FIG. 6A, FIG. 6B, and FIG. 6C are a graph and views illustrating one example of determination of guidance fuel consumption in a downhill coasting situation in accordance with an exemplary embodiment of the present invention.

In the graph shown in FIG. 6A, the horizontal axis indicates time, and the vertical axis indicates vehicle speed. Referring to FIG. 6A, the vehicle is decelerated by $\Delta v$ during a sampling section of downhill coasting even if any pedal is not operated, and instant fuel consumption, i.e., $$\frac{\Delta s_{downhill}}{0},$$

is displayed as Max as long as a fuel consumption amount is 0 regardless of a moving distance $\Delta s_{downhill}$ 610 during the corresponding sampling section, as exemplarily shown in FIG. 6B.

However, a vehicle speed is decreased by $\Delta v$ due to downhill coasting, but the present decrement $\Delta v$ is small, as compared to coasting on level ground. Therefore, since it is reasonable to be considered that fuel consumption during the corresponding sampling section is actually increased, guidance fuel consumption may be determined as $$\frac{\Delta s_{downhill,add}}{\Delta m}$$

by reflecting the increased coasting distance $\Delta s_{downhill,add}$, as compared to coasting on level ground, as exemplarily shown in FIG. 6C. That is, downhill coasting may be corrected to increase the available coasting distance similarly to operation of the accelerator pedal. Therefore, the guidance fuel consumption has a positive (+) value.

The above-described determination and display method of the guidance fuel consumption depending on situations will be summarized as follows, as exemplarily shown in FIG. 7.

Figure 7:
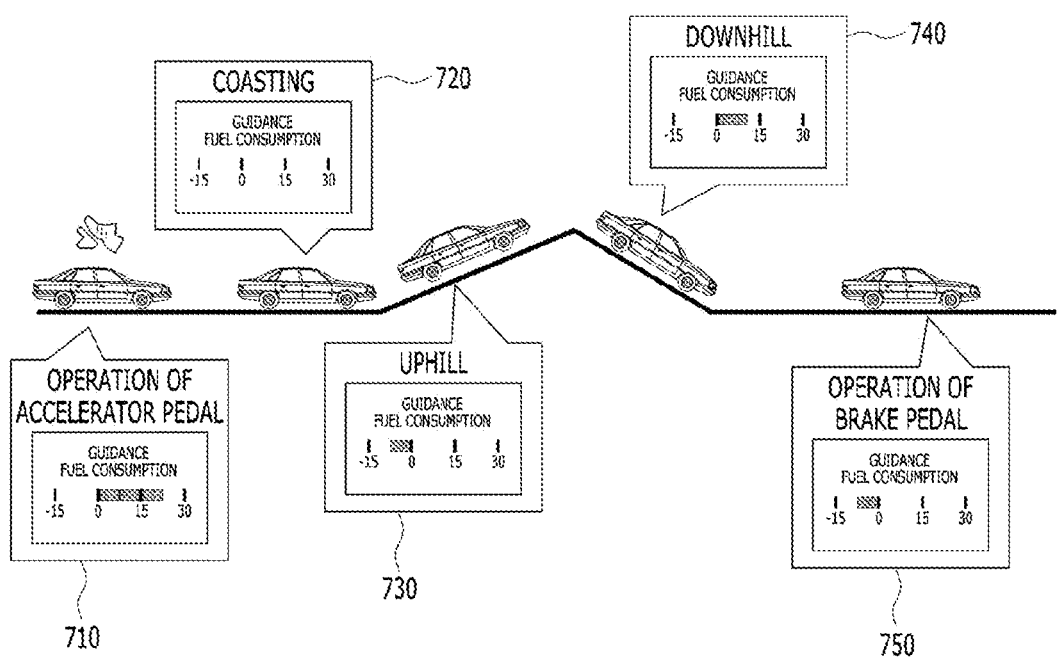
FIG. 7 is a view exemplarily illustrating one example of display types of guidance fuel consumption depending on situations in accordance with an exemplary embodiment of the present invention.

FIG. 7 is a view exemplarily illustrating one example of display types of guidance fuel consumption depending on situations in accordance with an exemplary embodiment of the present invention. FIG. 7 illustrates a situation in which a driver accelerates a vehicle by operating an accelerator pedal on level ground, passes through an uphill section and a downhill section, and then operates a brake pedal on level ground.

Referring to FIG. 7, the guidance fuel consumption is displayed as a positive (+) value due to an increase in the available coasting distance by acceleration when the vehicle is minimally accelerated 710, and the guidance fuel consumption is not displayed when the vehicle coast on level ground 720 because the available coasting distance is not changed. Furthermore, the guidance fuel consumption is displayed as a negative (−) value due to a decrease in the available coasting distance when the vehicles coasts on an uphill 730, and the guidance fuel consumption is displayed as a positive (+) value due to an increase in the available coasting distance when the vehicle coasts on a downhill 730. Furthermore, the guidance fuel consumption is displayed as a negative (−) value when a brake pedal of the vehicle is operated 750 because the available coasting distance is decreased.

Now, the configuration of a vehicle for performing the above-described determination and display method of the guidance fuel consumption will be described with reference to FIG. 8.

Figure 8:
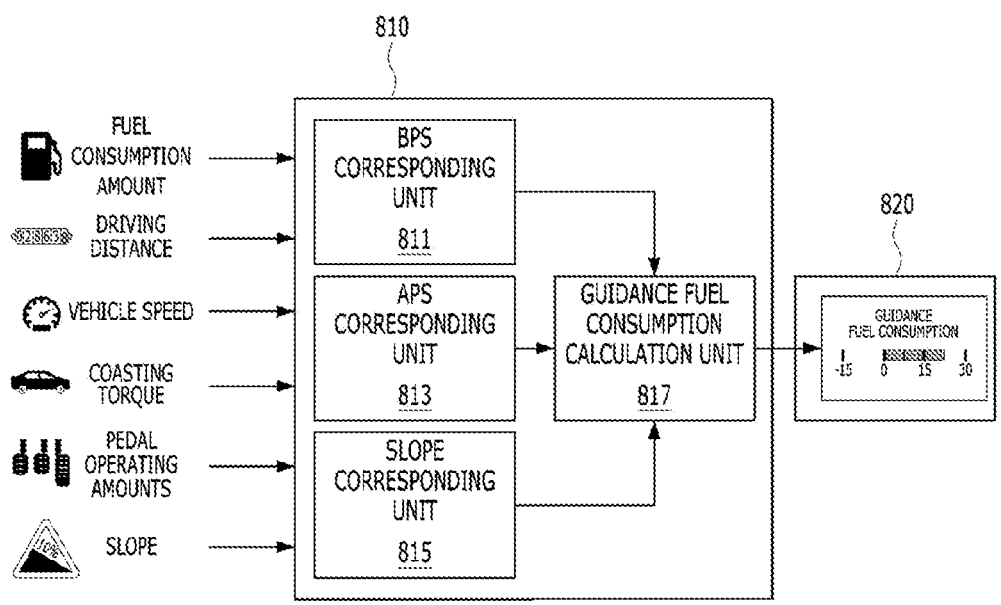
FIG. 8 is a block diagram illustrating one example of a vehicle structure in accordance with an exemplary embodiment of the present invention.

FIG. 8 is a block diagram illustrating one example of a vehicle structure in accordance with an exemplary embodiment of the present invention.

Referring to FIG. 8, a vehicle configured to output guidance fuel consumption in accordance with the present exemplary embodiment of the present invention may include a guidance fuel consumption controller 810 and an output unit 820. The guidance fuel consumption controller 810 may be implemented as a cluster controller or a trip computer, without being limited thereto. For example, the guidance fuel consumption controller 810 may be a controller which may be separately configured to determine guidance fuel consumption in accordance with an exemplary embodiment of the present invention, or a hybrid control unit (HCU) in the case of an eco-friendly vehicle, such as a hybrid electric vehicle.

The guidance fuel consumption controller 810 may use at least one of a fuel consumption amount, a driving distance, a vehicle speed, a coasting torque, pedal operating amounts, or a road slope as an input value. For example, the fuel consumption amount may be acquired from an engine control unit or an engine injector sensor, and the driving distance and the vehicle speed may be acquired from a vehicle speed sensor, a wheel sensor, an odometer (ODO) controller, etc. Furthermore, the coasting torque and the road slope may be acquired through comparison with a predetermined coasting profile. Otherwise, the coasting torque may be acquired from a hybrid control unit (HCU) in the case of an eco-friendly vehicle, such as a hybrid electric vehicle, and the road slope may be acquired from a tilt sensor or map information related to a navigation system. The pedal operating amounts may be acquired from sensors of respective pedals (i.e., a brake pedal sensor (BPS) and an accelerator pedal sensor (APS)).

Of course, the above-described methods of acquiring the respective pieces of information are only exemplary, and the present invention is not limited thereto.

Furthermore, the output unit 820 may be a display provided on the cluster or a head-up display, or the output unit 820 may be any device provided with a display unit which may display visual information, without being limited thereto.

The guidance fuel consumption controller 810 may include a BPS corresponding unit 811 configured to determine a decreased coasting distance due to operation of the brake pedal, an APS corresponding unit 813 configured to determine an increased coasting distance due to operation of the accelerator pedal and to record a fuel consumption amount when the accelerator pedal is operated, a slope corresponding unit 815 configured to determine a change in the coasting distance in a driving situation in which the vehicle deviates from a coasting profile on level ground due to a disturbance, such as a road slope, and a guidance fuel consumption calculation unit 817 configured to determine guidance fuel consumption based on changes in the coasting distance determined by the respective corresponding units 811, 813 and 815 and fuel consumption amounts corresponding to changes in speed in the respective sampling sections.

Figure 9:
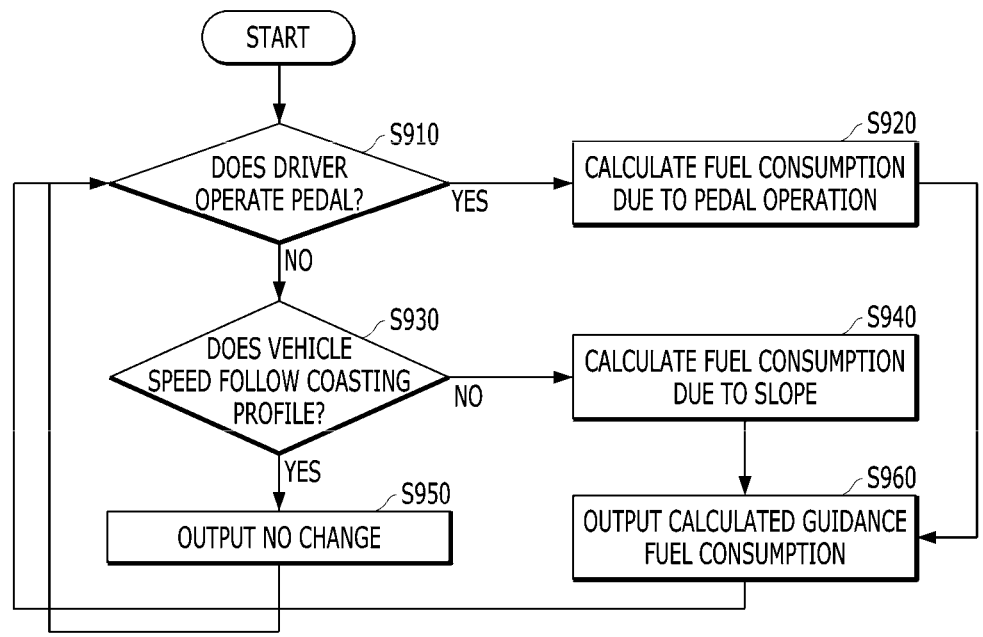
FIG. 9 is a flowchart illustrating one example of a process of outputting guidance fuel consumption in accordance with an exemplary embodiment of the present invention.

The above-described process of determining and outputting the guidance fuel consumption will be summarized through a flowchart shown in FIG. 9. FIG. 9 is a flowchart illustrating one example of a process of outputting guidance fuel consumption in accordance with an exemplary embodiment of the present invention.

Referring to FIG. 9, whether or not the driver operates the accelerator pedal or the brake pedal may be detected (Operation S910). When the driver operates any pedal, the BPS corresponding unit 811 or the APS corresponding unit 813 determines a change in the available coasting distance according to the kind of the operated pedal, and the guidance fuel consumption calculation unit 817 may determine guidance fuel consumption based on a fuel amount corresponding to changes in the available coasting distance and the vehicle speed (Operation S920). Here, determination of the guidance fuel consumption may be performed at a regular cycle during a sampling section having a designated time length. For example, if the performance cycle is 200 ms and the sampling section is 600 ms, a change in the available coasting distance corresponding to a change in the vehicle speed may be determined every 200 ms from 600 ms before a corresponding time point to the corresponding time point.

When the driver does not operate any pedal (No in Operation S910, i.e., a coasting state) and the vehicle speed does not follow the coasting profile on level ground (No in Operation S930), the slope corresponding unit 815 determines a change in the available coasting distance due to a disturbance, and the guidance fuel consumption calculation unit 817 may determine the guidance fuel consumption based on a fuel amount corresponding to the changes in the available coasting distance and the vehicle speed (Operation S940). Here, following the coasting profile may mean that a change in the vehicle speed according to time coincides with the predetermined coasting profile or differs from the predetermined coasting profile within a designated range.

In contrast, when the vehicle speed follows the coasting profile (Yes in Operation S930), the available coasting distance is not changed and thus a sign indicating no change may be output through the output unit 820 (Operation S950). Furthermore, the guidance fuel consumption determined in the pedal operation situation or when the vehicle speed deviates from the coasting profile may be output through the output unit 820 (Operation S960).

Furthermore, the guidance fuel consumption in accordance with various aspects of the present invention may be applied to eco-friendly vehicles, such as a hybrid electric vehicle.

In more detail, if regenerative braking or motor assist control, in which driving force of a motor is added to driving force of an engine, is performed in a hybrid electric vehicle, guidance fuel consumption may be determined by converting electrical energy, used or recovered during the corresponding braking or control, into an equivalent amount of fossil fuel consumption. Here, an equivalent conversion ratio may be 33.7 kWh per gallon, which is defined by the United States Environmental Protection Agency (EPA), but is not limited thereto. For example, on the assumption that an equivalent fuel value converted from a change in an SOC value of a battery during the sampling section is $\Delta m_{soc}$, guidance fuel consumption when the battery is charged (regenerative braking or the like) may be determined as $$\frac{\Delta s}{\Delta m} = \frac{\Delta s_{\Delta v, acc} + \Delta s_{\Delta v, coasting}}{\Delta m - \Delta m_{soc}}.$$

Furthermore, guidance fuel consumption when power of the battery is consumed (motor assist control, EV driving or the like) may be determined as $$\frac{\Delta s}{\Delta m} = \frac{\Delta s_{\Delta v, acc} + \Delta s_{\Delta v, coasting}}{\Delta m + \Delta m_{soc}}.$$

Such determination may be performed by the guidance fuel consumption calculation unit 817.

Through such a method, when the hybrid electric vehicle is driven in the EV mode, fuel consumption is not displayed as infinite, excessive inducement for the driver to perform EV driving of the vehicle is prevented, and thus actual fuel consumption of the vehicle by the driver may be improved.

The above-described method in accordance with an exemplary embodiment of the present invention may be implemented as computer readable code in computer readable recording medium in which programs are recorded. Computer readable recording media may include all kinds of recording media in which data readable by computer systems is stored. For example, the computer readable recording media may include a hard disk drive (HDD), a solid state disk (SSD), a silicon disk drive (SDD), a ROM, a RAM, a CD-ROM, a magnetic tape, a floppy disk, an optical data storage device, etc.

As is apparent from the above description, a vehicle in accordance with at least an exemplary embodiment of the present invention may provide more accurate information related to actual changes in fuel consumption.

In contrast with general instant fuel consumption, which is displayed as infinite when a driver does not operate an accelerator pedal, instant fuel consumption according to driver's pedal operation and a slope change may be provided based on an actual change in a driving distance.

Therefore, the driver may be induced to drive in consideration of actual fuel consumption.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of providing fuel consumption information related to a vehicle, the method comprising:
   detecting when one of an accelerator pedal and a brake pedal is operated;
   determining, by a controller, guidance fuel consumption based on a change in an available coasting distance according to a change in a vehicle speed due to operation of the one of the accelerator pedal and the brake pedal, which is detected; and
   outputting the determined guidance fuel consumption.

2. The method according to claim 1, wherein, when operation of the accelerator pedal is detected, the determining the guidance fuel consumption is performed based on a first moving distance during a sampling section having a predetermined time length, an increase in the available coasting distance due to an increase in the vehicle speed during the sampling section, and a fuel amount consumed during the sampling section.

3. The method according to claim 1, wherein, when operation of the brake pedal is detected, the determining the guidance fuel consumption is performed based on a fuel amount consumed during a previous acceleration section corresponding to a decrease in the vehicle speed during a sampling section having a predetermined time length, an increase in the available coasting distance during the previous acceleration section, and a moving length during the sampling section.

4. The method according to claim 1, further including:
   when operation of the accelerator pedal and the brake pedal is not detected, comparing a driving situation of the vehicle to a predetermined coasting profile.

5. The method according to claim 4, wherein, as a result of the comparing the driving situation of the vehicle to the predetermined coasting profile, upon determining that the driving situation of the vehicle follows the predetermined coasting profile, the outputting the determined guidance fuel consumption is performed to indicate no change in the guidance fuel consumption.

6. The method according to claim 4, further including:
   as a result of the comparing the driving situation of the vehicle to the predetermined coasting profile, upon determining that the driving situation of the vehicle does not follow the predetermined coasting profile, determining the guidance fuel consumption based on a change in the available coasting distance due to a disturbance.

7. The method according to claim 6, wherein the disturbance includes at least one of uphill driving or downhill driving of the vehicle.

8. The method according to claim 1, wherein, when the vehicle includes a driving motor, the determining the guidance fuel consumption is performed in further consideration of consumption or charging of battery power by the driving motor.

9. A non-transitory computer readable recording medium having recorded thereon a program to execute the method according to claim 1.

10. A vehicle of providing fuel consumption information, the vehicle comprising:
    a guidance fuel consumption controller configured to detect when one of an accelerator pedal and a brake pedal is operated and to determine guidance fuel consumption based on a change in an available coasting distance according to a change in a vehicle speed due to operation of the one of the accelerator pedal and the brake pedal, which is detected; and
    an output unit configured to output the determined guidance fuel consumption.

11. The vehicle according to claim 10,
    wherein, when operation of the accelerator pedal is detected, the guidance fuel consumption controller is configured to determine the guidance fuel consumption based on a first moving distance during a sampling section having a predetermined time length, an increase in the available coasting distance due to an increase in the vehicle speed during the sampling section, and a fuel amount consumed during the sampling section.

12. The vehicle according to claim 10,
    wherein, when operation of the brake pedal is detected, the guidance fuel consumption controller is configured to determine the guidance fuel consumption based on a fuel amount consumed during a previous acceleration section corresponding to a decrease in the vehicle speed during a sampling section having a predetermined time length, an increase in the available coasting distance during the previous acceleration section, and a moving length during the sampling section.

13. The vehicle according to claim 10,
    wherein, when operation of the accelerator pedal and the brake pedal is not detected, the guidance fuel consumption controller compares a driving situation of the vehicle to a predetermined coasting profile.

14. The vehicle according to claim 13,
    wherein, when the guidance fuel consumption controller is configured to determine that the driving situation of the vehicle follows the predetermined coasting profile, as a result of the comparing the driving situation of the vehicle to the predetermined coasting profile, the output unit indicates no change in the guidance fuel consumption.

15. The vehicle according to claim 13,
    wherein, when the guidance fuel consumption controller is configured to determine that the driving situation of the vehicle does not follow the predetermined coasting profile, as a result of the comparing the driving situation of the vehicle to the predetermined coasting profile, the fuel guide consumption controller is configured to determine the guidance fuel consumption based on a change in the available coasting distance due to a disturbance.

16. The vehicle according to claim 15,
    wherein the disturbance includes at least one of uphill driving or downhill driving of the vehicle.

17. The vehicle according to claim 10, further including:
a driving motor and a battery configured to supply power to the driving motor,
wherein the guidance fuel consumption controller is configured to determine the guidance fuel consumption in further consideration of consumption or charging of battery power by the driving motor.

* * * * *